(12) United States Patent
Daio et al.

(10) Patent No.: US 7,806,340 B2
(45) Date of Patent: Oct. 5, 2010

(54) METHOD OF INSTALLING IC TAG

(75) Inventors: Fumio Daio, Osaka (JP); Kazunori Haraguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 177 days.

(21) Appl. No.: 11/448,153

(22) Filed: Jun. 7, 2006

(65) Prior Publication Data
US 2007/0019349 A1 Jan. 25, 2007

(30) Foreign Application Priority Data
Jun. 7, 2005 (JP) .............................. 2005-167115

(51) Int. Cl.
*G06K 19/06* (2006.01)
(52) U.S. Cl. ..................................... 235/492
(58) Field of Classification Search ................ 235/492; 702/57; 340/870.3, 10.3
See application file for complete search history.

(56) References Cited

U.S. PATENT DOCUMENTS

| 4,825,060 A | * | 4/1989 | Kushima | ..................... 235/492 |
| 5,202,838 A | * | 4/1993 | Inoue | ........................... 702/57 |
| 5,353,350 A | * | 10/1994 | Unsworth et al. | ............ 713/194 |
| 5,394,047 A | * | 2/1995 | Scharlack et al. | ...... 310/316.01 |
| 5,988,510 A | * | 11/1999 | Tuttle et al. | .................. 235/492 |
| 6,421,013 B1 | * | 7/2002 | Chung | .................. 343/700 MS |
| 6,501,390 B1 | * | 12/2002 | Chainer et al. | ......... 340/870.16 |
| 6,510,984 B2 | * | 1/2003 | Blankenship et al. | ........ 235/375 |
| 2004/0066296 A1 | * | 4/2004 | Atherton | ................... 340/572.1 |
| 2005/0168340 A1 | * | 8/2005 | Mosher et al. | ........... 340/572.8 |
| 2006/0007020 A1 | * | 1/2006 | Biermann | .................... 340/945 |
| 2007/0152829 A1 | * | 7/2007 | Lindsay et al. | ........... 340/572.3 |

FOREIGN PATENT DOCUMENTS

| JP | 2000-293658 | 10/2000 |
| JP | 2003-346121 | 12/2003 |

* cited by examiner

*Primary Examiner*—Thien M Le
(74) *Attorney, Agent, or Firm*—McDermott Will & Emery LLP

(57) ABSTRACT

An IC chip in an IC tag is provided with a voltage application terminal in connection with its internal circuit, and a high voltage or a reverse voltage is applied to the voltage application upon unlawful handling of the IC tag, so that the IC chip is electrically broken down. In this way, an IC tag installed in an item is prevented from being misused when the IC tag is no longer necessary or being removed for misuse.

13 Claims, 2 Drawing Sheets

METHOD OF INSTALLING IC TAG

The present disclosure relates to subject matter contained in priority Japanese Patent Application No. 2005-167115, filed on Jun. 7, 2005, the contents of which is herein expressly incorporated by reference in its entirety.

BACKGROUND OF THE INVENTION

1. Field of the Invention

The invention relates to a method of installing an IC tag, such IC tag is attached to an item and is capable of preventing the misuse of information recorded therein.

2. Description of the Related Art

The use of IC tags has received much attention as a next generation of recognition technology that replaces the use of barcodes and IC tags are expected to be used in various fields such as manufacturing and distribution. The technology is also expected as essential technology for an upcoming "ubiquitous society." As the use of IC tags has become more prevalent, leakage of information recorded in IC tags or the misuse of IC tags such as replacing them may increase.

There is a known IC tag structure as a technique of protecting against unlawful use of IC tags, according to which an IC tag attached to an item cannot be reused once it is removed from the item (see Japanese Patent Publication No. 2003-346121). The IC tag structure includes an antenna and a communication circuit on the substrate, and a short-circuiting part is additionally provided through a delaminating layer that promotes delamination into layers. The surface of the substrate is covered with a protective sheet with a delaminating protective layer therebetween. When the protective sheet is removed, the short-circuiting part is destroyed by delamination caused by the delaminating layer and removed together with the protective sheet, which disables the communication circuit.

However, the IC tag function is disabled while the IC chip including a memory that stores information is intact, and therefore the information recorded in the memory can be stolen from the IC chip or the IC chip itself can be misused. The information recorded in the IC chip must be deleted using a reader/writer or the reading function must be stopped by flag operation. However, this is possible only when an appropriate reader/writer is available. On this account, another IC tag structure has been proposed that allows the IC chip to be mechanically destroyed (see Japanese Patent Publication No. 2000-293658).

In the disclosed IC tag structure, a thin grooved part is formed on the opposite side to the surface for a semiconductor base circuit forming the IC chip, and the IC chip is mechanically destroyed from the thin part when external force is applied to the semiconductor base. When an IC tag including the IC chip is attached to an item and force is applied in an attempt to remove the IC chip, the IC chip is mechanically destroyed, and therefore the information recorded in the IC chip is not read out.

As the IC tag has been reduced in size, however, the IC chip has come to be so small that one side of the chip is less than 1 mm. It would be extremely difficult to break down the small IC chip by force applied to the thin part and caused by the effect of peeling for example, and it is still uncertain whether the IC tag can surely be destroyed by the method.

BRIEF SUMMARY OF THE INVENTION

The invention has been devised in view of the conventional problems described above, and it is therefore an object of the invention to provide a method of installing an IC tag that allows recorded information in its IC chip to be surely prevented from being leaked by the means provided for electrically or thermally breaking down the IC chip.

To achieve the above described object, in a method of installing an IC tag according to a first aspect of the invention, an IC tag includes an IC chip and an antenna. The method comprises: providing the IC chip with electrical breakdown means for electrically breaking down its internal circuit and breakdown activation means activated in response to externally applied force for transmitting a breakdown signal to the electrical breakdown means; and activating the breakdown activation means as required.

In this way, when an IC tag installed in an item is no longer necessary or if there is unlawful handling of the IC tag, a breakdown signal is transmitted from the breakdown activation means to the electrical breakdown means, so that the IC chip of the IC tag is electrically broken down. Therefore, malicious misuse of the IC tag removed from the item or unlawful conduct such as reading out information recorded in the IC chip is prevented.

In this configuration, the electrical breakdown means may be formed as a voltage application terminal connected to the internal circuit of the IC chip and the breakdown activation means may serve as high voltage generation means for outputting a high voltage as the breakdown signal, so that the high voltage output from the high voltage generation means is applied to the internal circuit of the IC chip from the voltage application terminal and the circuit is broken down.

The electrical breakdown means may be formed as a voltage application terminal connected to the internal circuit of the IC chip and the breakdown activation means may serve as reverse voltage generation means for generating a voltage with polarity reversed from a voltage requested by the internal circuit, so that the internal circuit is broken down by the reverse voltage applied from the voltage application terminal to the IC chip.

In order to achieve the above described object, in a method of installing an IC tag according to a second aspect of the invention, an IC tag includes an IC chip and an antenna. The method comprises: providing the IC chip with thermal breakdown means for thermally breaking down the IC chip and breakdown activation means activated in response to externally applied force for transmitting a breakdown signal to the thermal breakdown means; and activating the breakdown activation means as required.

In this way, when an IC tag installed in an item is no longer necessary or if there is unlawful handling of the IC tag, a breakdown signal is transmitted from the breakdown activation means to the thermal breakdown means, so that the thermal breakdown means raises its temperature and thermally breaks down the IC chip of the IC tag. Therefore, malicious misuse of the IC tag removed from the item or unlawful conduct such as reading out information recorded in the IC chip is prevented.

In this configuration, the thermal breakdown means may be formed as a heat generating element that generates heat in response to an applied current and the breakdown activation means may serve as connection opening/closing means for connecting a current output from a current generation source to the heat generating element as a breakdown signal. In this way, when the connection opening/closing means is closed and a current is applied for a short period of time to the heat generating element from a battery as the current generation source or another power source, the temperature of the heat generating element increases and the IC chip having only a small heat capacity is thermally broken down.

While novel features of the invention are set forth in the preceding, the invention, both as to organization and content, can be further understood and appreciated, along with other

DESCRIPTION OF THE PREFERRED EMBODIMENTS

Now, embodiments of the invention will be described with reference to FIGS. 1 to 4. Note that the following embodiments are simply examples of how the invention is embodied and should not to be construed as limiting the technical scope of the invention.

Figure 1:
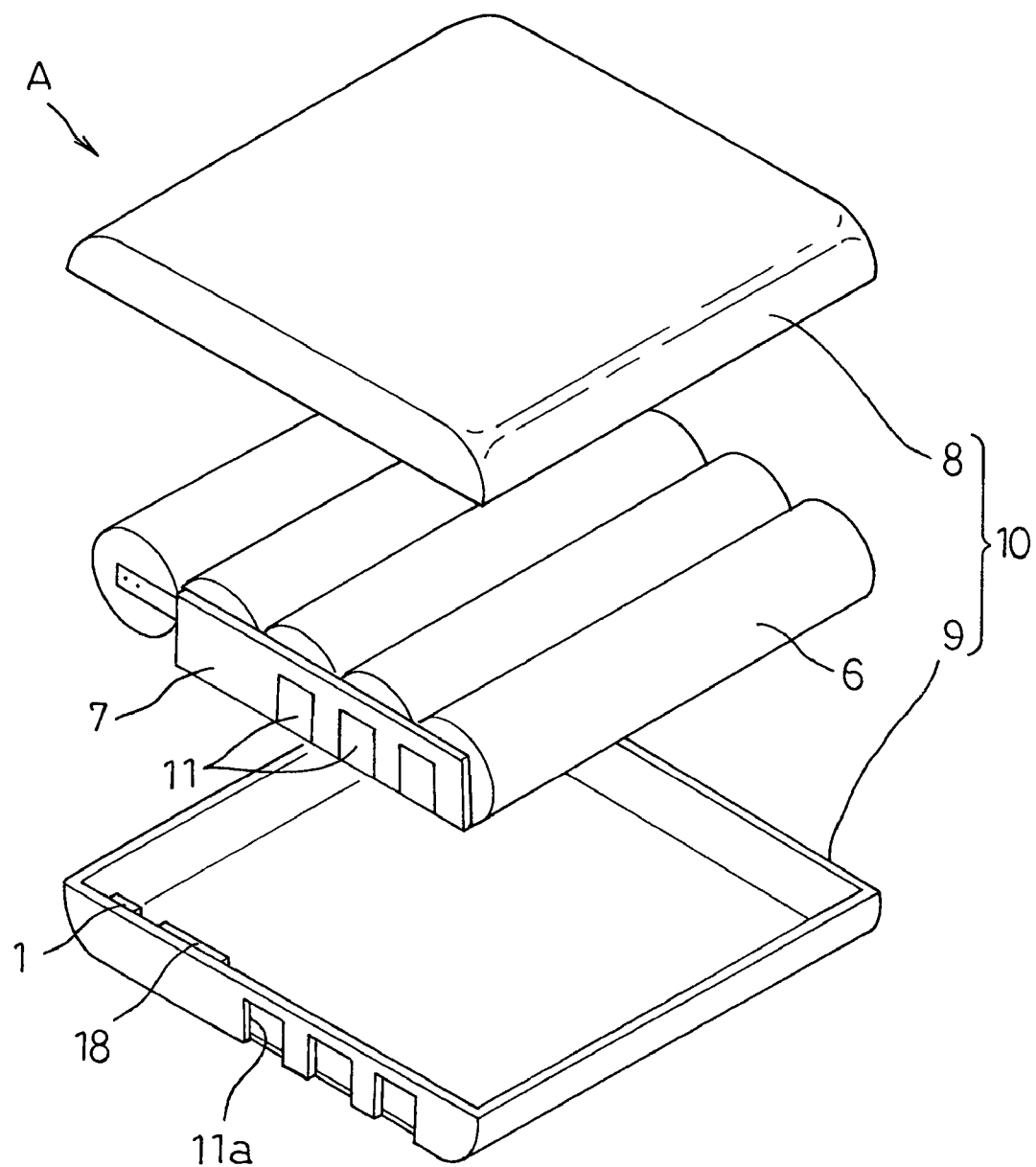
FIG. 1 is an exploded perspective view of the structure of a battery pack according to a first embodiment of the invention.

FIG. 1 is a view of a battery pack A to which a method of installing an IC tag according to a first embodiment of the invention is applied. The battery pack A has a rechargeable battery 6 and a circuit board 7 including a protection circuit and a control circuit therefor which are accommodated in a pack case 10 produced by joining the upper case 8 and the lower case 9. An external connection terminal 11 formed on the circuit board 7 is exposed to the outside from a terminal window 11a formed at a side of the pack case 10.

The battery pack A has an IC tag 1 installed inside the pack case 10, and the IC chip of the IC tag 1 stores identification information that identifies the kind of the battery pack A. The battery pack A has its external connection terminal 11 connected to a load device that operates using the battery pack A as a power source or a charger that charges the rechargeable battery 6 of the battery pack A. Therefore, the battery pack A must be electrically compatible with the load device or the charger. However, it is often the case that counterfeit battery packs having a low quality rechargeable battery are sold and a lot of failures or accidents caused by the use of such counterfeit battery packs have been reported. Therefore, the identity of the battery pack A as a rightful item must be recognized by the load device or the charger. The identification information is therefore recorded in the IC tag 1. Then, when connected with the battery pack A, the load device or the charger reads out the identification information from the IC tag 1 and verifies its rightfulness and only then electrical connection is permitted.

The battery pack A is designed and manufactured so that the rechargeable battery 6 and the circuit board 7 are compatible to provide prescribed performance or reliability. Therefore, it is necessary that the rechargeable battery 6 and the circuit board 7 should be prevented from being altered by disassembling. The capability of identifying the rightful item amounts to naught unless the battery pack A is prevented from being disassembled and its identification information recorded in the IC tag 1 is prevented from being read for the purpose of producing a counterfeit battery pack or a copy of the IC tag 1 itself is prevented from being produced. Therefore, the battery pack A according to the embodiment has a function of destroying the IC tag 1 if the battery pack A is disassembled.

Figure 2:
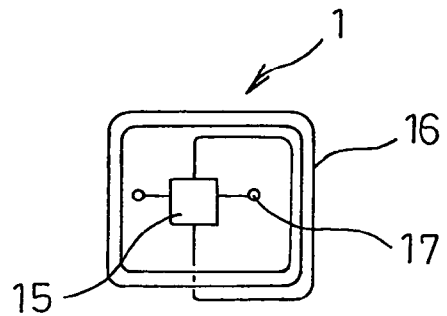
FIG. 2 illustrates the structure of an IC tag according to the first embodiment of the invention.

As shown in FIG. 2, the IC tag 1 is a non-contact IC tag that includes an IC chip 15 as a memory that stores identification information and an antenna 16. The antenna 16 receives an access electric wave from a reader for identification information provided at the load device or the charger or from a reader/writer formed as a countermeasure against counterfeit items and allows operating power for the IC chip 15 to be generated. The antenna also transmits the identification information to the reader or the reader/writer. A breakdown voltage application terminal (electrical breakdown means) 17 is provided in connection with the internal circuit of the IC chip 15 in order to electrically break down the IC chip 15 if the battery pack A is unlawfully handled such as being disassembled. The breakdown voltage application terminal 17 may be an antenna connection terminal provided at the IC chip 15 for connection with the antenna 16.

A breakdown voltage generator (breakdown activation means) 18 is provided in the pack case 10. The breakdown voltage generator 18 provides the breakdown voltage application terminal 17 with a voltage to break down the internal circuit of the IC chip 15 if the upper and lower cases 8 and 9 are pulled apart from each other for disassembling or if there is an attempt to remove the rechargeable battery 6 or the circuit board 7. The breakdown voltage generator 18 may be formed as a piezoelectric element (high voltage generation means) that generates a high voltage in response to mechanical impact applied thereupon or a breakdown voltage generation circuit that generates a high voltage or reverse voltage from the voltage available from the rechargeable battery 6.

Figure 3:
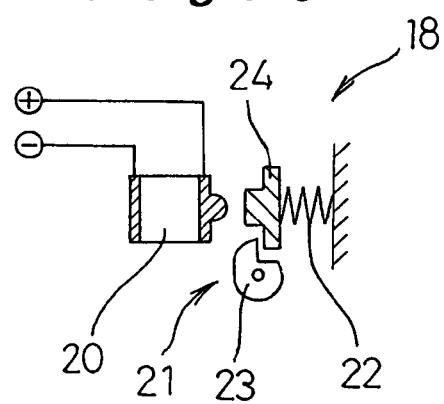
FIG. 3 is a schematic view of an example of the structure of a high voltage generating device.

FIG. 3 is a view of an example of how the breakdown voltage generator 18 is formed. The generator includes a piezoelectric element 20 and an impact device 21 that applies mechanical impact upon the element. The piezoelectric element 20 is preferably a piezoelectric ceramic of a PZT (lead zirconate titanate) based material and generates such a high voltage that sparks are produced in response to mechanical impact applied thereupon. In this configuration, the high voltage needs only break down the small IC chip 15 formed in an integrated circuit having small circuit elements and interconnections, and even small impact applied from the impact device 21 on the small piezoelectric element 20 causes a voltage high enough to break down the internal circuit. As described above, with the impact device 21, if the upper and lower cases 8 and 9 are pulled apart from each other for disassembling or if there is an attempt to remove the rechargeable battery 6 or the circuit board 7, the destructive force produced by the action energizes a spring 22 to open the lock 23 of the hammer 24, which in turn strikes the piezoelectric element 20. The piezoelectric element 20 generates a high voltage between the positive and negative electrodes in response to the strike from the hammer 24, so that the high voltage is applied to the breakdown voltage application terminal 17.

The breakdown voltage generation circuit may have such a circuit configuration that a voltage capable of breaking down the internal circuit of the IC chip 15 is generated using the power from the rechargeable battery 6 and the generated voltage is applied to the breakdown voltage application terminal 17. Alternatively the circuit may have such a circuit configuration that a reverse voltage, i.e., a voltage with polarity reversed from the operation voltage of the IC chip 15 is applied to the breakdown voltage application terminal 17. The breakdown voltage generation circuit breaks down the IC chip 15 with short-time voltage application, and therefore the power of the rechargeable battery 6 is not much consumed. However, if the IC chip 15 is destroyed, the battery pack A no longer functions, and therefore, if the battery voltage is applied directly as the reverse voltage, the circuit configuration may be complete simply by interconnecting the rechargeable battery 6 and the IC chip 15.

Figure 4:
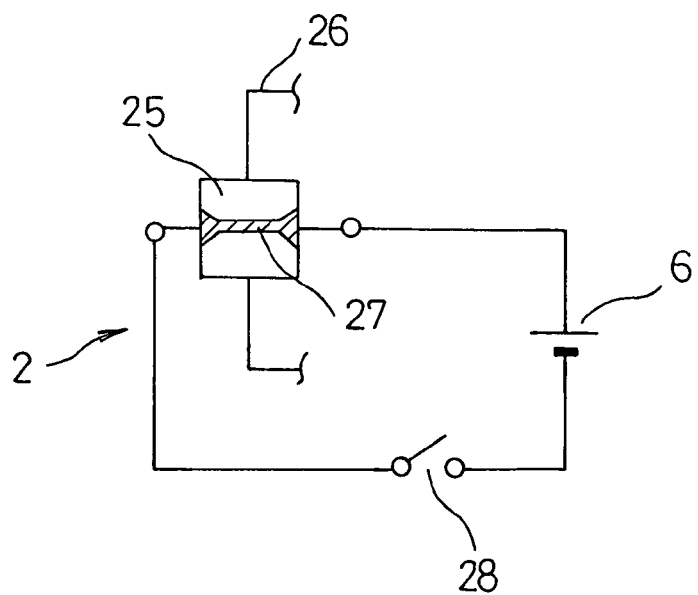
FIG. 4 is a diagram of the structure of an IC tag according to a second embodiment of the invention.

FIG. 4 shows the configuration of an IC tag 2 according to a second embodiment of the invention. Similarly to the IC tag 1 according to the first embodiment, the IC tag is a non-contact IC tag that includes an IC chip 25 forming a memory that stores the identification information of a battery pack A and an antenna 26. The antenna 26 receives an access electric wave from a reader for identification information provided at the load device or the charger or from a reader/writer as a countermeasure against counterfeit items, allows operating power for the IC chip 25 to be produced and transmits the identification information to the reader or the reader/writer.

The IC chip 25 has a heating element 27 installed in its surface and the heating element 27 has its both ends connected to the rechargeable battery 6 that forms the battery pack A through a connection opening/closing structure (breakdown activation means) 28. If the upper and lower cases 8 and 9 are pulled apart from each other for disassembling or if there is an attempt to remove the rechargeable battery 6 or the circuit board 7, the connection opening/closing structure 28 causes a spring driven lock to be opened in response to the destructive force caused by the action, so that the connection circuit between the rechargeable battery 6 and the heating element 27 is closed.

When the opening/closing structure 28 is closed, a current is passed to the heating element 27 from the rechargeable battery 6. Therefore, when the heating element 27 is formed as a resistive heating element having a prescribed resistance value, a current determined based on the voltage of the rechargeable battery 6 is passed, which causes the heating element 27 to generate heat, and the IC chip 25 is thermally broken down. Since the temperature that allows the IC chip 25 to be thermally broken down is estimated in advance, the material that provides the heat generating temperature is properly selected for the heat generating element 27, and a current is set to a value at which the heat generating temperature is attained. In this way, the IC chip 25 is broken down in a short time. When the IC chip 25 is thus broken down, the battery pack A no longer functions, and therefore there is no problem to obtain a current that may cause the rechargeable battery 6 to attain an over discharge state.

In the foregoing embodiments of the invention, the IC tag 1 or 2 is installed in the battery pack A by way of illustration, while in electrical appliances using a battery power supply or an AC power supply, the IC chip is broken down by voltage or current application. When the item having the tag installed therein does not use a power supply, the IC chip can be broken down by applying a high voltage from the piezoelectric element.

As described above, according to the invention, when an IC tag installed in an item is no longer necessary or if there is an unlawful attempt to disassemble or alter an IC tag for misuse, the IC tag has its IC chip broken down, and therefore malicious misuse of the IC tag by installing it in another item or unlawful conduct such as reading out information recorded in the IC chip is prevented.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of making an IC tag, the method comprising:
    installing, in a device, an antenna and an IC chip with an electrical breakdown circuit that destroys another circuit included in the IC chip in response to a breakdown voltage;
    installing a breakdown voltage generation circuit which generates the breakdown voltage
    in response to a mechanical force applied to the device.

2. The method of making an IC tag according to claim 1, wherein
    the electrical breakdown device is formed as a voltage application terminal connected to the internal circuit of the IC chip and
    the breakdown voltage generation circuit generates, as the breakdown voltage, a reverse voltage with polarity reversed from a voltage used by the IC chip in standard operation.

3. A method of making an IC tag according to claim 1, wherein
    the electrical breakdown circuit comprises a heating element which generates heat, which destroys another portion of the IC chip, in response to the breakdown voltage.

4. The method of installing an IC tag according to claim 3, further comprising:
    installing a connection opening/closing device for connecting a current output from a current generation source to the heating element as a the breakdown voltage.

5. The method of claim 1, wherein the mechanical force results from opening a unit including the IC tag.

6. An IC tag-bearing device, comprising:
    an IC tag including an IC chip and an antenna, the IC chip including an electrical breakdown circuit that destroys another circuit included in the IC chip in response to a breakdown voltage; and
    a breakdown voltage generation circuit which generates the breakdown voltage in response to a mechanical force applied to the IC tag-bearing device.

7. The IC tag-bearing device of claim 6, wherein
    the electrical breakdown circuit includes a voltage application terminal; and
    the breakdown voltage generation circuit generates, as the breakdown voltage, a reverse voltage with polarity reverse from a voltage used by the IC chip in standard operation.

8. The IC tag-bearing device of claim 6, wherein
    the breakdown voltage generation circuit comprises a piezoelectric element which generates the breakdown voltage in response to the mechanical force.

9. The IC tag-bearing device of claim 8, further comprising a striking element which applies a second mechanical force to the piezoelectric element in response to the mechanical force applied to the IC tag-bearing device.

10. The IC tag-bearing device of claim 9, further comprising
    a battery; wherein
    power is supplied from the battery to the heating element in response to the mechanical force.

11. The IC tag-bearing device of claim 6, further comprising
    a battery, wherein
    the breakdown voltage generation circuit generates the breakdown voltage from power supplied by the battery.

12. The IC tag-bearing device of claim 6, wherein the mechanical force results from opening the IC tag-bearing device.

13. The IC tag-bearing device of claim 6, wherein
    the electrical breakdown circuit comprises a heating element which generates heat, which destroys another portion of the IC chip in response to the breakdown voltage.

* * * * *